US011932044B2

(12) United States Patent
Brandstetter et al.

(10) Patent No.: US 11,932,044 B2
(45) Date of Patent: Mar. 19, 2024

(54) SECURITY ELEMENT WITH MACHINE-READABLE FEATURES

(71) Applicant: Hueck Folien Gesellschaft m.b.H., Baumgartenberg (AT)

(72) Inventors: Gottfried Brandstetter, Grein (AT); Marco Mayrhofer, Perg (AT)

(73) Assignee: Hueck Folien Gesellschaft m.b.H., Baumgartenberg (AT)

( * ) Notice: Subject to any disclaimer, the term of this patent is extended or adjusted under 35 U.S.C. 154(b) by 197 days.

(21) Appl. No.: 17/610,800

(22) PCT Filed: May 6, 2020

(86) PCT No.: PCT/EP2020/062621
§ 371 (c)(1),
(2) Date: Nov. 12, 2021

(87) PCT Pub. No.: WO2020/229271
PCT Pub. Date: Nov. 19, 2020

(65) Prior Publication Data

US 2022/0194117 A1 Jun. 23, 2022

(30) Foreign Application Priority Data

May 14, 2019 (EP) .................................... 19174396

(51) Int. Cl.
*B42D 25/369* (2014.01)
*B42D 25/29* (2014.01)
(Continued)

(52) U.S. Cl.
CPC ............ *B42D 25/369* (2014.10); *B42D 25/29* (2014.10); *B42D 25/328* (2014.10); *B42D 25/47* (2014.10)

(58) Field of Classification Search
CPC ............................ B42D 25/369; B42D 25/328
(Continued)

(56) References Cited

U.S. PATENT DOCUMENTS 5,354,099 A 10/1994 Kaule et al.
8,123,138 B2 2/2012 Schutzmann et al.
(Continued)

FOREIGN PATENT DOCUMENTS

DE 3781894 T2 1/1993
EP 0 310 707 B1 9/1992
(Continued)

OTHER PUBLICATIONS

International Search Report in PCT/EP2020/062621, dated Sep. 4, 2020.

*Primary Examiner* — Allyson N Trail
(74) *Attorney, Agent, or Firm* — Collard Roe, P.C.

(57) ABSTRACT

A security element has machine-readable magnetic security features in the form of at least two magnetic materials which have different magnitudes of coercive force and which are provided as a mixture in at least one printing ink that is applied onto a carrier substrate, wherein the at least one printing ink is provided in at least two regions on the security element with the same thickness and/or different thicknesses, and a defined mixture ratio of the at least two magnetic materials with different magnitudes of coercive force is provided in the at least one printing ink.

18 Claims, 8 Drawing Sheets

Figure 1:
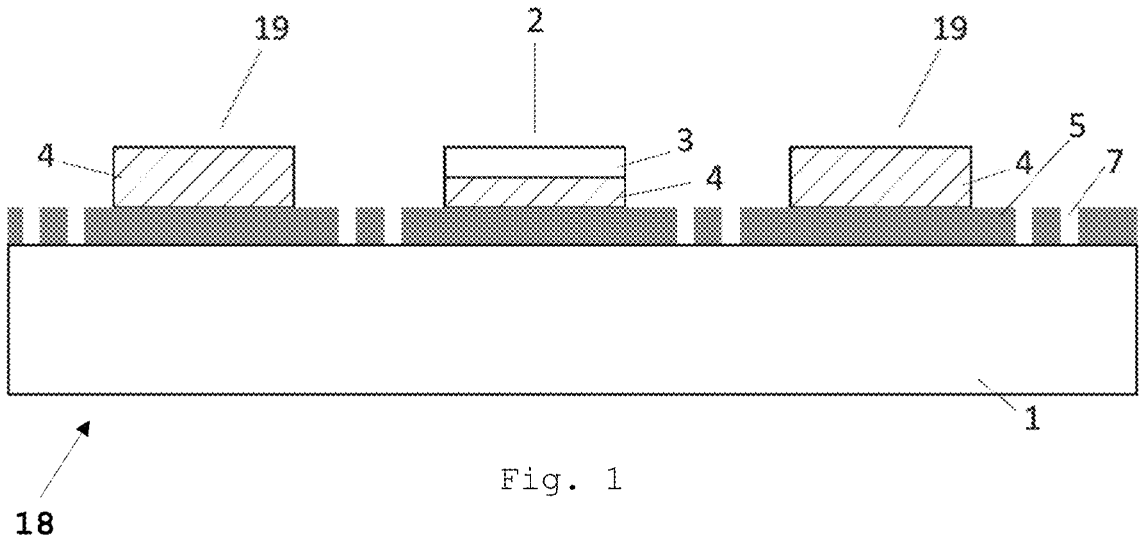

(51) Int. Cl.
*B42D 25/328* (2014.01)
*B42D 25/47* (2014.01)

(58) Field of Classification Search
USPC .......................................................... 235/493
See application file for complete search history.

(56) References Cited

U.S. PATENT DOCUMENTS

| | | | | |
|---|---|---|---|---|
| 8,544,893 | B2 | 10/2013 | Schuetzmann et al. | |
| 8,646,688 | B2 | 2/2014 | Zoister et al. | |
| 9,336,640 | B2 | 5/2016 | Schuetzmann et al. | |
| 9,387,718 | B2 | 7/2016 | Mayrhofer et al. | |
| 2010/0327062 | A1* | 12/2010 | Lazzerini | B42D 25/29 235/491 |
| 2013/0087616 | A1* | 4/2013 | Lazzerini | B42D 25/378 235/493 |
| 2013/0234426 | A1 | 9/2013 | Mueller et al. | |
| 2014/0191035 | A1* | 7/2014 | Paul | G07D 7/04 235/450 |
| 2014/0367469 | A1* | 12/2014 | Schutzmann | G06K 19/06 235/450 |
| 2015/0102108 | A1* | 4/2015 | Ehresmann | B32B 15/00 235/493 |
| 2015/0376422 | A1* | 12/2015 | Lefebvre | B41M 3/14 252/62.51 R |
| 2016/0055358 | A1* | 2/2016 | Paul | G07D 7/04 235/450 |
| 2016/0271996 | A1* | 9/2016 | Sautter | B42D 25/328 |

FOREIGN PATENT DOCUMENTS

| | | | |
|---|---|---|---|
| EP | 0 516 790 | B1 | 10/1996 |
| EP | 1 871 616 | B1 | 1/2013 |
| EP | 2 578 414 | A1 | 4/2013 |
| WO | 2004/049268 | A1 | 6/2004 |
| WO | 2006/042667 | A1 | 4/2006 |
| WO | 2008/061707 | A1 | 5/2008 |
| WO | 2008/148523 | A1 | 12/2008 |
| WO | 2009/090676 | A1 | 7/2009 |
| WO | 2012/025216 | A1 | 3/2012 |

* cited by examiner

SECURITY ELEMENT WITH MACHINE-READABLE FEATURES

CROSS REFERENCE TO RELATED APPLICATIONS

This application is the National Stage of PCT/EP2020/062621 filed on May 6, 2020, which claims priority under 35 U.S.C. § 119 of European Application No. 19174396.2 filed on May 14, 2019, the disclosure of which is incorporated by reference. The international application under PCT article 21(2) was not published in English.

The invention relates to a security element for securing data carriers, documents of value and the like, which has machine-readable security features, in particular magnetic features.

Security elements that have machine-readable features, in particular magnetic features, are known.

From EP 0 516 790 B1 a security document with a security element in the form of a thread or strip of transparent plastic material is known, which has a metallic layer with recesses in the form of characters, patterns or the like, wherein above or below this metallic layer a further magnetic layer is arranged in such a way that at least the readable recesses remain free.

From EP 0 310 707 B1 a document with magnetically detectable security features is known, which have regions with variable magnetic field strength.

However, with this two-dimensional magnetic information, the storage space for information is limited by the two-dimensional orientation.

A security element with spatially resolved magnetic coding is known from EP 1 871 616 B1. The magnetic codings are applied in two partial layers on different sides of the carrier substrate simultaneously with transparent recesses in the form of patterns, characters, letters, geometric figures, lines, guilloches and the like, wherein the respective magnetic layers partially overlap and wherein the magnetic codings can be spatially resolved and a coding normal to the carrier substrate plane is added to the two codings in the carrier substrate plane.

From WO 2006/042667 A1, security elements are known which have at least two magnetic materials, wherein the magnetic materials have different coercivities. The materials are applied to and/or incorporated in the security element in such a way that their remanence is equally large.

From WO 2009/090676 A1 a security element is known, in particular for banknotes, security cards and the like, which comprises a first substrate which is at least partially opaque when viewed in transmitted light, wherein magnetic regions are applied to the substrate. The magnetic regions comprise at least two different magnetic regions having different coercivity and whose residual magnetism may be the same or different. The magnetic regions are arranged to generate at least three codes different from each other.

It was the object of the invention to provide a security element with machine-readable, in particular magnetic security features, which has an increased resistance to forgery, is easy to manufacture and enables unambiguous identification.

It is therefore an object of the invention to provide a security element with machine-readable security features in the form of magnetic security features, which has at least two magnetic materials which have a different coercivity, wherein the magnetic materials of different coercivity are present as a mixture in at least one printing ink which is applied to a carrier film, wherein the at least one printing ink is provided in at least two regions on the security element in the same and/or different thickness, and there is a defined mixing ratio of the at least two different magnetic materials of different coercivity in the at least one printing ink.

By applying the at least one printing ink in different regions of the carrier film, different magnetic regions are formed on the said carrier film, wherein each magnetic region is built up by exactly one printing ink, and the magnetic regions can either be directly adjacent to one another or can be spaced apart from one another.

By using a defined mixing ratio, it is possible to create a unique magnetic coding that is difficult to forge. It is not necessary that the arrangement of the magnetic regions forms a magnetic coding.

According to the invention, the magnetic coding is carried out by mixing the at least two magnetic materials of different coercivity in the printing ink forming the magnetic regions and applying them with the same or different thickness to the security element. In this regard, it is initially perfectly sufficient if only a single printing ink with a defined mixing ratio is used. This has the advantage of simple and inexpensive production with nevertheless high security, since with use of only one printing ink no production fluctuations, compared with the overprinting of several printing inks, can exert an influence. Furthermore, the same printing ink can be used to feed several printing cylinders. The different signal strengths are generated exclusively by the different thicknesses with which the printing ink is applied.

The two magnetic materials are preferably a high-coercivity material and a low-coercivity material, wherein a high-coercivity magnetic material in this context means materials with >1500 Oe and a low-coercivity material means materials with <500 Oe. Preferably, the magnetic materials are selected such that they do not interfere with each other during magnetization. Since a 3-fold stronger magnetic field is usually used for each magnetic material during magnetization, the difference in the coercivity of the magnetic materials has to be chosen accordingly.

Multiple printing inks may also be used to improve security, with each printing ink having a different mixing ratio of the at least two magnetic materials.

In one embodiment of the invention, mutually adjacent magnetic regions are formed by different printing inks.

In a further variant of the invention, the magnetic regions formed by the at least one printing ink are applied spaced apart from one another, but it may also be advantageous to apply two or more, identical or different printing inks of different thicknesses directly adjacent to one another in the lateral direction, thereby forming a magnetic region group. Several magnetic region groups can be arranged on the carrier substrate spaced apart from one another, preferably equally spaced apart from one another.

In this case, the printing inks of a magnetic region group may have different thicknesses, wherein the thicknesses preferably increase or decrease from one side of the magnetic region group to the opposite side.

The printing ink, which comprises a mixture of the at least two magnetic materials of different coercivities, is applied to a carrier substrate at least in some regions Suitable carrier substrates include, for example, transparent carrier films, preferably flexible plastic films, for example made of polyimide (PI), polypropylene (PP), monoaxially oriented polypropylene (MOPP), biaxially oriented polypropylene (BOPP), polyethylene (PE), polyphenylene sulfide (PPS), polyetheretherketone (PEEK), polyetherketone (PEK), polyethyleneimide (PEI), polysulfone (PSU), polyaryletherketone (PAEK), polyethylene naphthalate (PEN), liquid crystalline polymers (LCP), polyester, polybutylene terephthalate (PBT), polyethylene terephthalate (PET), polyamide (PA), polycarbonate (PC), cycloolefin copolymers (COC), polyoxymethylene (POM), acrylonitrile butadiene styrene (ABS), polyvinyl chloride (PVC), ethylene tetrafluoroethylene (ETFE), polytetrafluoroethylene (PTFE), polyvinyl fluoride (PVF), polyvinylidene fluoride (PVDF), and ethylene tetrafluoroethylene hexafluoropropylene fluoroterpolymer (EFEP). The carrier films can be transparent, translucent, semi-opaque or opaque.

The carrier films preferably have a thickness of 5-700 μm, preferably 5-200 μm, particularly preferably 5-50 μm.

Furthermore, metal foils, for example Al, Cu, Sn, Ni, Fe or stainless steel foils with a thickness of 5-200 μm, preferably 10 to 80 μm, particularly preferably 20-50 μm, can also serve as a carrier substrate. The foils can also be surface-treated, coated or laminated, for example with plastics, or painted.

Furthermore, cellulose-free or cellulose-containing paper, thermoactivatable paper or composites with paper, for example composites with plastics with a basis weight of 20-500 $g/m^2$, preferably 40-200 $g/m^2$ can be used as carrier substrates.

The security features according to the invention can thereby be applied to the carrier substrate to form a security element. This security element can then be finished and at least partially embedded in or applied to a data carrier or a document of value as a strip, thread or patch.

It is also possible to design the security element as a transfer element, wherein the carrier substrate can be peeled off after application to the data carrier or value document.

Alternatively, however, the security features can also be generated directly on the data carrier or the value document by printing the ink of at least two magnetic materials of different coercivity at least in certain regions at a predetermined location on the data carrier or value document.

According to the invention, a printing ink containing at least two magnetic materials of different coercivities is used.

The mixing ratio of the magnetic materials with different coercivities is set in a defined manner. When two magnetic materials of different coercivities are used, the mixing ratio between a magnetic material of high coercivity and a magnetic material of low coercivity can be 20:1 to 1:20, preferably 10:1 to 1:10, particularly preferably 5:1 to 1:5.

The mixing ratio and thus the printing ink can be the same for all magnetic regions of the security element.

The ratio of the different magnetic materials remains exactly constant during printing, regardless of the thickness of the applied printing inks. With the same ratio of magnetic materials, magnetic regions of different remanence are created if printing inks of different thicknesses are applied.

However, it is also possible to provide different mixing ratios for different magnetic regions of the security element. For this purpose, two or more printing inks are used, wherein the mixing ratios of the magnetic materials in the printing inks are different.

In a further embodiment, in addition to the magnetic regions formed from a printing ink comprising a mixture of two or more magnetic materials having different coercive strengths, magnetic regions comprising only low-coercivity magnetic material or only high-coercivity magnetic material may be provided on the security element. Thereby, on the security element, in addition to the magnetic regions formed of a printing ink comprising a mixture of two or more magnetic materials having different coercivities, there are preferably provided either regions of magnetic material having low coercivity or regions of magnetic material having high coercivity.

The security element may have further layers with security features.

For example, an opaque layer in the form of a reflective layer or a printed layer, for example a colored, black, or white printed layer, may be provided on the carrier substrate below and/or above the magnetic layer regions, which may be applied over the entire surface or partially.

In this context, a reflective layer is understood to be, for example, a metallic layer of Al, Cu, Ag, Au, Pd, Pt, Sn, In or alloys thereof and the like, which can be applied by PVD or CVD processes, by sputtering, electron beam evaporation or the like. A reflective layer is also understood to mean, for example, a metallic-appearing layer, such as, for example, a coating or printing ink layer containing metallic pigments or flakes, or pigments or flakes of metallic compounds, such as metal oxides. These layers are preferably applied by known printing methods, by doctoring or painting.

Furthermore, the reflective layer can also be an HRI (High Refractive Index) layer, for example a printed layer in the form of a lacquer layer or a printing ink with a high refractive index.

A partially applied reflective layer or a printed layer may preferably have recesses in the form of letters, numbers, patterns, characters, symbols, lines and the like.

The recesses in the reflective layer are preferably arranged in such a way that they are located in the magnetic-layer-free regions. Thus, on the one hand, the magnetic layer regions are visually covered so that they are not visible even when viewed in transmitted light, and on the other hand, an additional security feature is created by the recesses in the metallic or metallic-appearing layer or the printed layer that are visible in transmitted light.

Such a reflective layer may alternatively be provided on the side of the carrier substrate opposite the magnetic regions, or on both sides of the carrier substrate.

In the event that the reflective layer is provided on the same side of the carrier substrate below and/or above the magnetic regions, it may be useful to provide a protective layer between this layer and the magnetic regions in order to prevent mutual interference between the magnetic layer and the metallic layer. The protective layer prevents, for example, corrosion phenomena, in particular when the security element is exposed to moisture, especially if the layer is metallic or contains metallic pigments or flakes.

This protective layer can take the form of a thin film, but can also be a protective lacquer layer.

Furthermore, optically variable security features can also be present on the carrier substrate or in the layer structure, for example diffractive structures, such as surface reliefs, holograms, diffraction gratings and the like, or also layers which exhibit a viewing-angle-dependent color change effect. Such security features with viewing-angle-dependent color change effects are formed, for example, by thin film elements comprising a reflective layer, a dielectric spacer layer and an absorber layer, or by cholesteric liquid crystal layers combined with a dark, preferably black, printing layer or metallization. However, printing layers with interference pigments or liquid crystalline pigments can also be used to produce a layer with a viewing-angle-dependent color change effect.

Further, the security element may optionally include additional colored, black, gray, or white printed layers.

All these security features can be applied over the entire surface or partially on one or both sides of the carrier substrate. The security features can be applied true to register and/or with register accuracy, for example to the magnetic regions.

The term true to register or register accuracy is understood to mean a defined position of the features in relation to each other.

These security features can also be applied in such a way that they are at least partially located in or at least partially cover the magnetic-layer-free regions.

The further security features may also be provided on a second carrier substrate and may be bonded by lamination or lining to the layered structure on which the magnetic regions are located Optionally, the second carrier substrate can then be peeled off. Expediently, the security element may be provided on one and/or both sides with a protective lacquer layer in order to protect the security features present on the security element against mechanical, physical and/or chemical influences The protective lacquer layer may be based, for example, on nitrocellulose, acrylates and their copolymers, polyamides and their copolymers, polyvinyl chlorides and their copolymers, or may consist of a crosslinking lacquer.

Further, the security element may be provided with an adhesive layer on one or both sides to enable it to be fixed to or within a data carrier or value document. This adhesive layer may be in the form of either a heat seal, cold seal or self-adhesive coating.

The protective lacquer layer and/or the adhesive layer can also be pigmented, wherein all known pigments or dyes, for example $TiO_2$, ZnS, kaolin, ATO, FTO, aluminum, chromium and silicon oxides or, for example, organic pigments, such as phthalocyanine blue, i-indolide yellow, dioxazine violet and the like, can be used as pigments. Furthermore, luminescent dyes or pigments which fluoresce or phosphoresce in the visible, in the UV range or in the IR range, effect pigments such as liquid crystals, pearlescent, bronzes and/or multilayer color change pigments, and heat-sensitive dyes or pigments can be added. These can be used in all possible combinations. In addition, luminescent pigments can also be used alone or in combination with other dyes and/or pigments.

The security element may also be configured as a transfer element, wherein after the security element has been applied to a data carrier or value document, the carrier substrate may be peeled off.

To facilitate the removal of the carrier substrate, a release layer can be provided on the carrier substrate and under the layer structure present on the carrier substrate.

FIGS. 1 to 12*a* show embodiments of the security element according to the invention.

The numbers mean the following in the figures:

1 The carrier substrate
2 Magnetic regions/printing ink
3 Proportion of high-coercivity magnetic material in the printing ink, from which
the magnetic region is formed
4 Proportion of low-coercivity magnetic material in the printing ink from which the
magnetic region is formed
5 An opaque layer in the form of a reflective layer
6 An opaque layer in the form of a black, white, grey or colored printing layer
7 Recesses in the opaque layer
8 A transparent protective layer
9 A lacquer layer having a diffractive structure
A release layer
11 A dielectric spacer layer
12 An absorber layer
13 An adhesive layer
14 An LC layer
A primer or undercoat layer
16 A printed color-changing layer with interference pigments
17 A laminating adhesive layer
18 Security element
19 Regions with low/high-coercivity material The embodiment illustrated in FIG. 1 shows a security element 18 comprising a carrier substrate 1 made of a plastic film, for example PET, to which an opaque layer in the form of a reflective layer 5 with recesses 7 is applied. The recesses 7 may be in the form of letters, numbers, characters, patterns, symbols or lines.

Magnetic regions 2 spaced apart from each other are applied to the reflective layer 5. The magnetic regions 2 have the same distance between each other and thus do not form any coding.

The coding results from the composition of the magnetic regions 2 and their sequence.

In the embodiment shown in FIG. 1, regions 19 of low-coercivity material and magnetic regions 2 of a printing ink having fixed proportions 4 of low-coercivity printing ink and fixed proportions 3 of high-coercivity printing ink are applied. The ratio in this exemplary embodiment is 1:1, but other mixing ratios within the range of 1:20 to 20:1 according to the invention are also possible.

A hidden magnetic coding is formed by the magnetic regions 2 from the printing ink with fixed proportions of both low-coercivity and high-coercivity material.

The recesses 7 in the reflective layer 5 may also be designed in accurate register with the magnetic-layer-free regions.

Alternatively, a black, white or colored printing layer 6 may be provided in place of the reflective layer 5.

In an embodiment not shown, the reflective layer 5 or the printing layer 6 with recesses 7 may also be provided on the side of the carrier substrate opposite the magnetic regions 2.

Figure 1A:
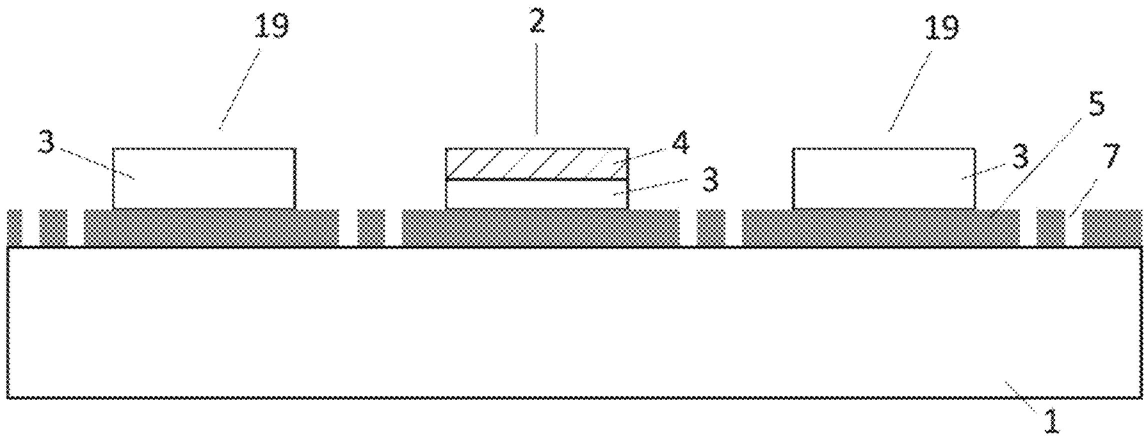

FIG. 1*a* illustrates an embodiment analogous to FIG. 1 in which regions 19 of high-coercivity material are provided instead of regions 19 of low-coercivity material.

Figure 2:
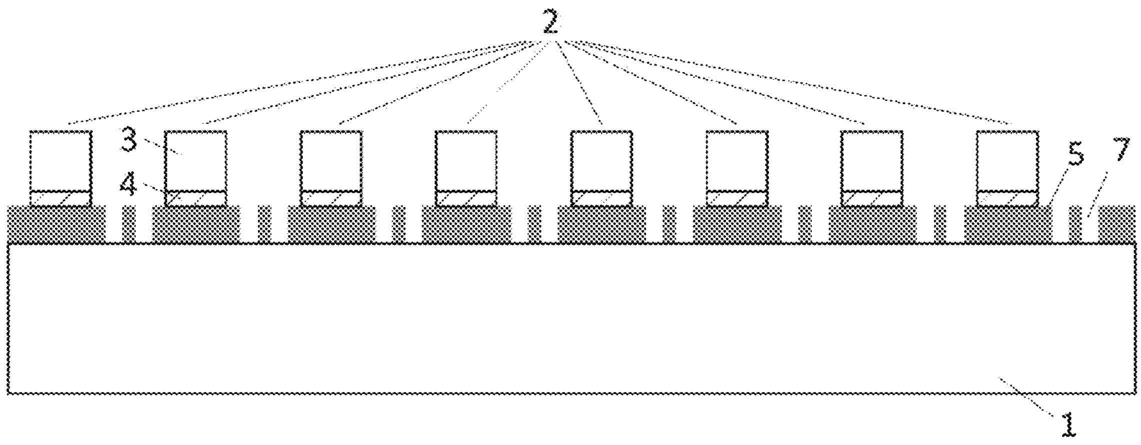

FIG. 2 shows an embodiment in which a reflective layer 5 with recesses 7 is applied to a carrier substrate 1, which may consist of a transparent, semi-transparent or opaque plastic film.

On the reflective layer 5, magnetic regions 2 which are spaced apart from each other are applied, each of which is made of a printing ink having fixed proportions of high-coercivity material 3 and low-coercivity material 4. The ratio of high-coercivity material 3 to low-coercivity material 4 in this exemplary embodiment is 4:1.

The magnetic regions 2 have the same distance from each other, the coding results from the fixed proportions of both low-coercivity and high-coercivity material of the printing ink.

In an embodiment not shown, the magnetic regions 2 may be applied with different thicknesses, which additionally results in different remanences.

Alternatively, a black, white or colored printing layer 6 may be provided in place of the reflective layer 5.

In an embodiment not shown, the reflective layer 5 or the printing layer 6 with recesses 7 may also be provided on the side of the carrier substrate opposite the magnetic regions 2.

Figure 3:
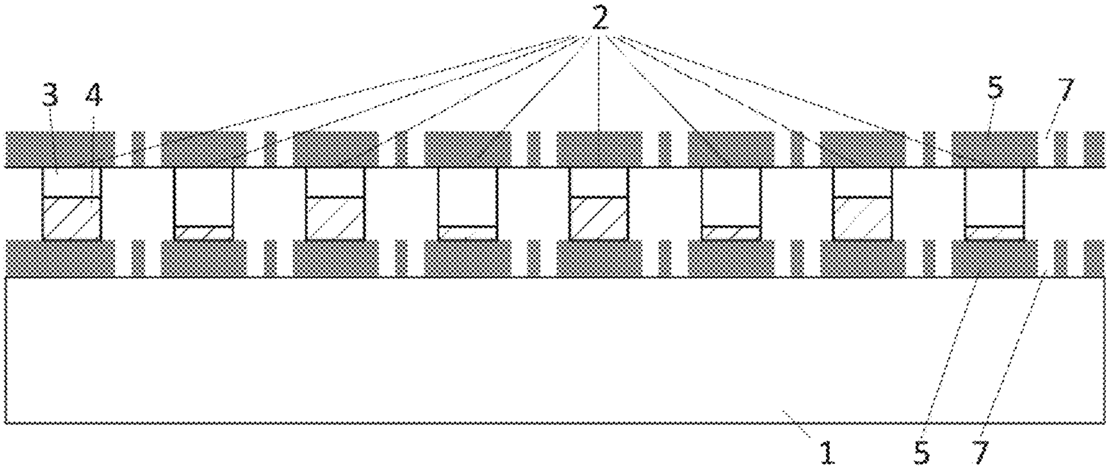

FIG. 3 shows an embodiment in which magnetic regions 2 are printed with different mixing ratios of low-coercivity material 4 and high-coercivity material 3. In the illustrated embodiment, two printing inks with different mixing ratios are shown, but 3 or more printing inks with different mixing ratios of the magnetic materials can also be used. The magnetic regions 2 are arranged so that they are equally spaced from each other.

A reflective layer 5 with recesses 7 is arranged above and below each of the magnetic regions 2, wherein the recesses in the two reflective layers are arranged true to register with one another. In the magnetic-layer-free regions, the recesses 7 of the two reflective layers 5 can be seen in transmitted light.

On the one hand, the coding results from the mixture of the specified proportions of both low-coercivity and high-coercivity material of the respective magnetic regions 2 as well as the different mixing ratios in the printing inks used.

Alternatively, a black, white or colored printing layer 6 may be provided in place of the reflective layer 5.

In an embodiment not shown, the reflective layer 5 or the printing layer 6 with recesses 7 may also be provided on the side of the carrier substrate 1 opposite the magnetic regions 2.

Figure 4:
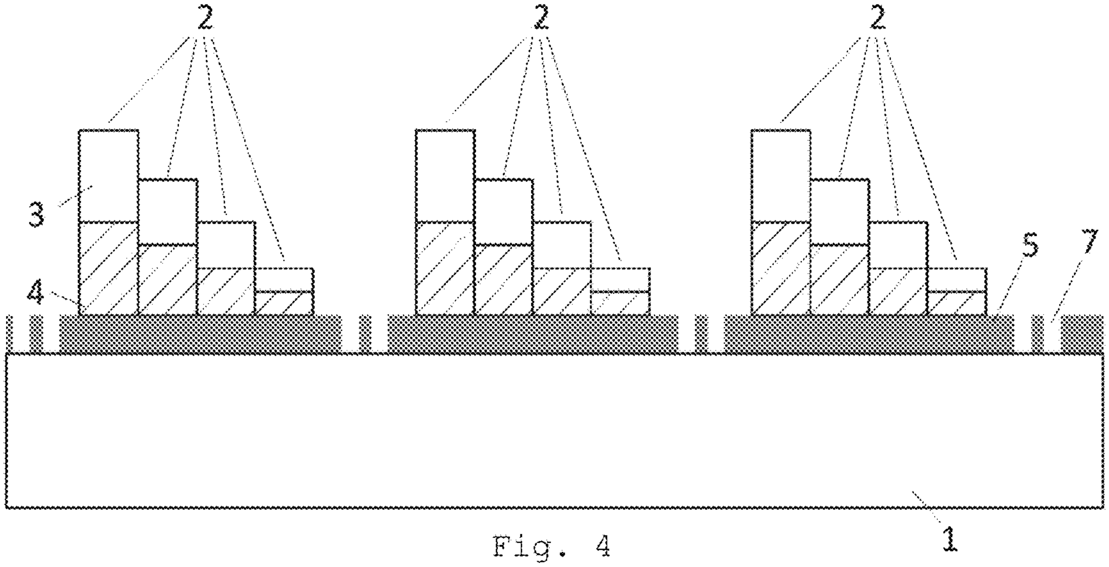

FIG. 4 shows an embodiment according to the invention in which printing inks (and thus magnetic regions 2) with the same mixing ratio of high-coercivity and low-coercivity materials 3, 4 with different thicknesses and the same width are printed directly adjacent to one another on the partially applied reflective layer 5 with recesses 7 present on a carrier substrate 1, whereby several magnetic region groups are formed. Between each of the three magnetic region groups shown, magnetic-layer-free regions are provided. The mixing ratio of low-coercivity material 4 and high-coercivity material 3 of each printing ink of each magnetic region group is 1:1 in this exemplary embodiment. The different thicknesses of the printing inks result in different remanences within the magnetic region groups consisting of four adjacent printing inks of different thicknesses.

In an alternative embodiment thereto, a security element may comprise only a single magnetic region group.

Figure 4A:
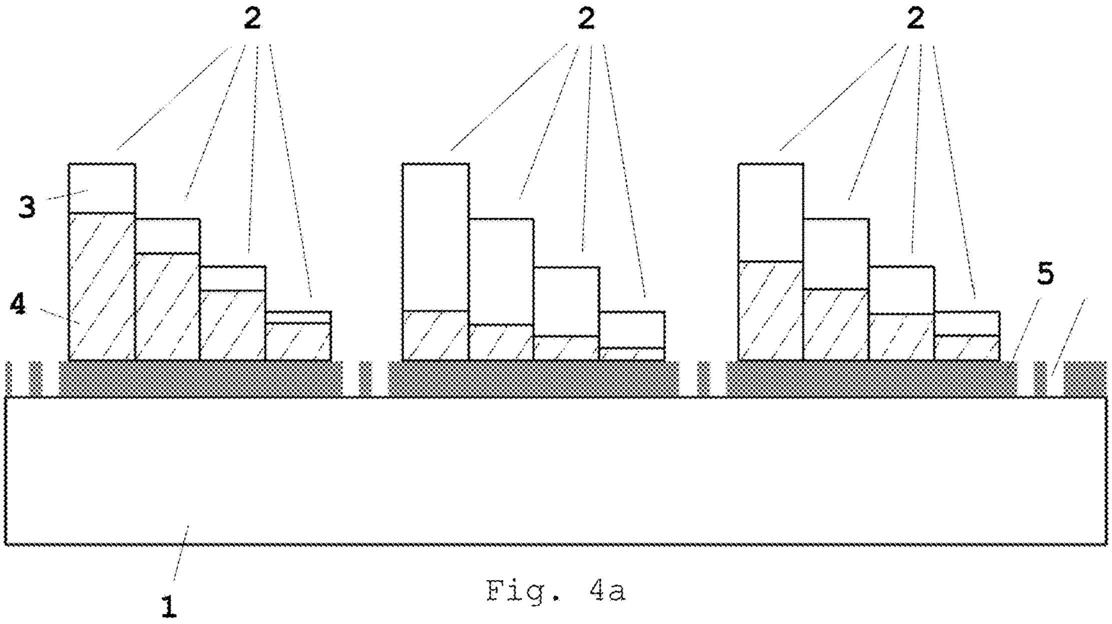

FIG. 4*a* shows an embodiment similar to that shown in FIG. 4, with the difference that at least one magnetic region group is formed by printing inks having a different mixing ratio of high-coercivity and low-coercivity materials 3, 4 than printing inks of other magnetic region groups.

Figure 4B:
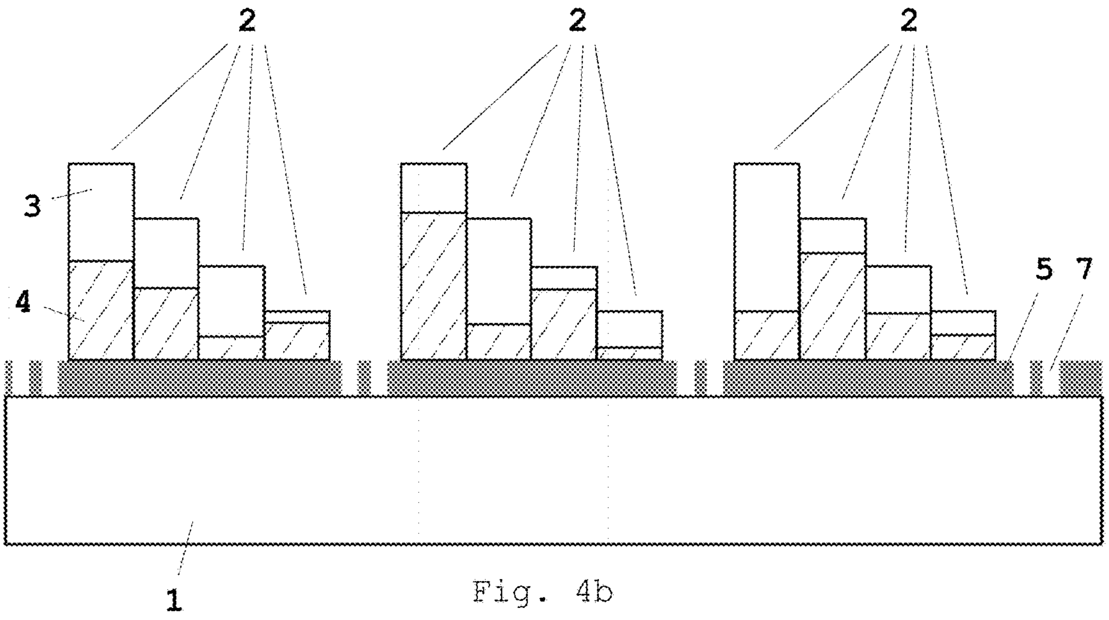

Alternatively, as shown in FIG. 4*b*, one or more magnetic region groups may be formed by printing inks having mutually different mixing ratios of high-coercivity and low-coercivity materials 3, 4.

Figure 4C:
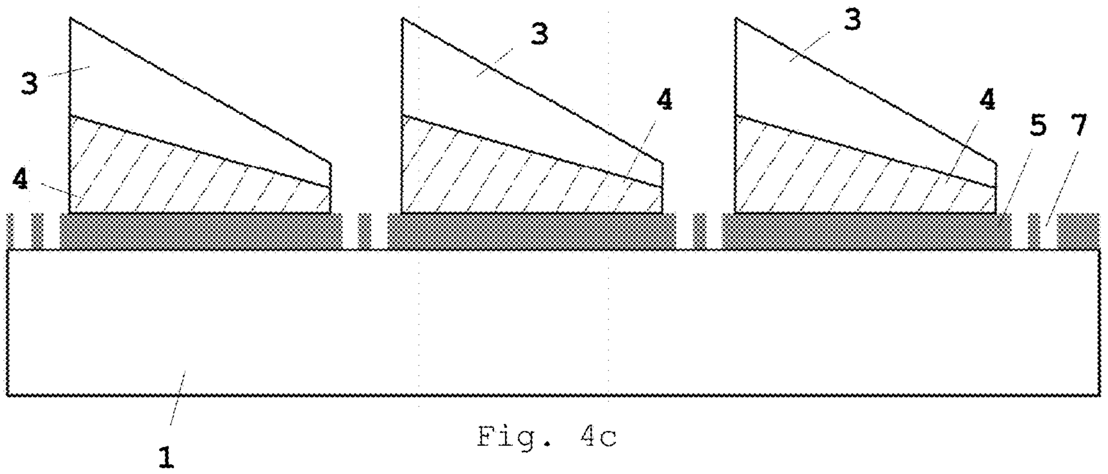
Figure 4D:
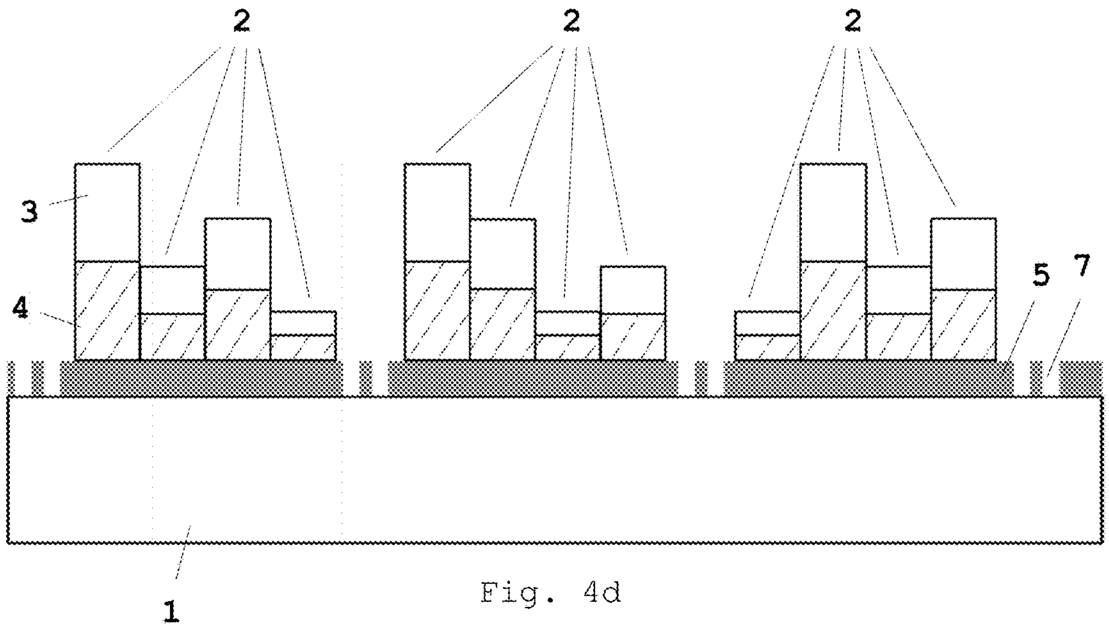

The printing inks 2 of a magnetic region group can also be applied in such a way that they each have a decreasing or increasing thickness when viewed in one direction, wherein the increase or decrease in thickness can also take place in a progressive manner, as shown in FIG. 4*c*. Alternatively, however, the thickness of the printing inks or magnetic regions can be formed in such a way that neither a progression nor a step-shaped, continuous increase or decrease is formed in this respect, as is shown in FIG. 4*d*.

Alternatively, instead of the partially applied reflective layer 5, a black, white or colored printing layer 6 may also be partially applied.

In an embodiment not shown, the reflective layer 5 or the printing layer 6 with recesses 7 may also be provided on the side of the carrier substrate opposite the magnetic region groups.

Figure 5:
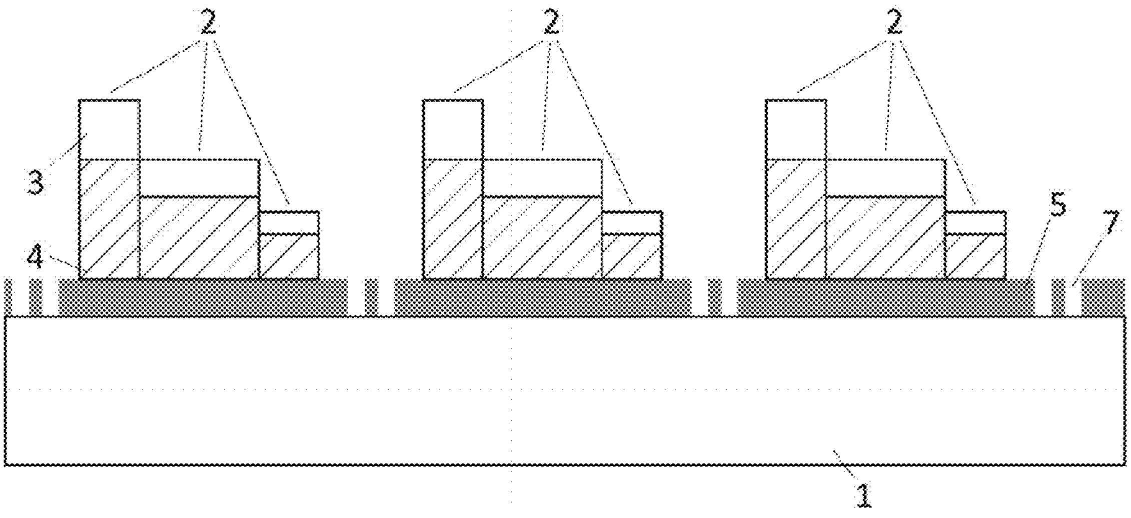

In the exemplary embodiment shown in FIG. 5, the magnetic region groups are applied with respective printing inks having a fixed mixing ratio of low-coercivity material 4 and high-coercivity material 3 in different widths and different thicknesses spaced apart from each other on the partially applied reflective layer 5 with recesses 7 present on a carrier substrate 1. Magnetic-layer-free regions are provided between the three magnetic region groups shown. The mixing ratio of low-coercivity material 4 and high-coercivity material 3 per printing ink is 2:1 for each magnetic region group in this exemplary embodiment. The different thicknesses of the printing inks result in different remanences within the three magnetic region groups. In accordance with the exemplary embodiments shown in FIGS. 4 to 4*d*, the mixing ratios and thicknesses of each ink can also be varied in the exemplary embodiment shown in FIG. 5.

Alternatively, a black, white or colored printing layer 6 may be provided in place of the reflective layer 5.

In an embodiment not shown, the reflective layer 5 or the printing layer 6 with recesses 7 may also be provided on the side of the carrier substrate 1 opposite the magnetic region groups.

Figure 6:
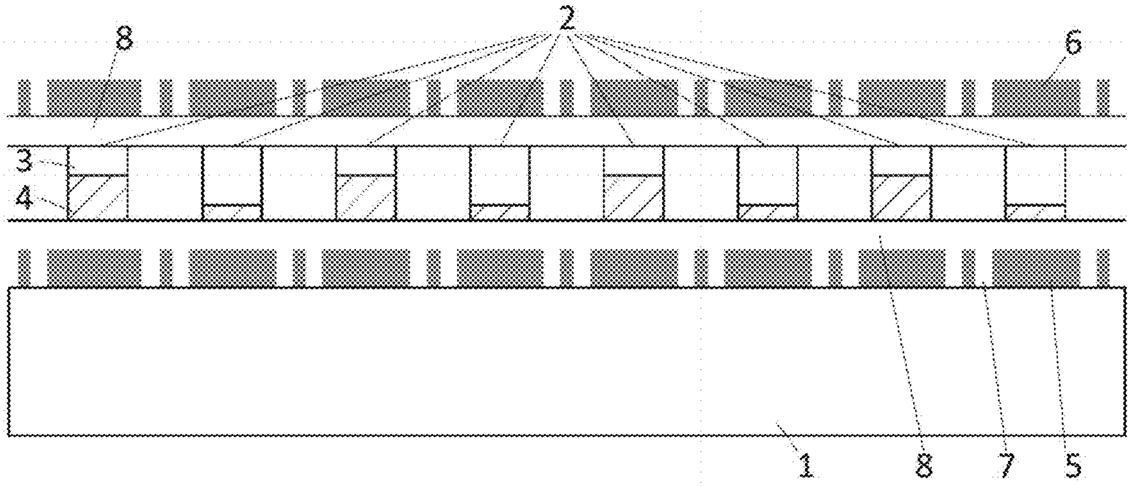

FIG. 6 shows an embodiment according to the invention, in which a protective layer 8 is provided between the reflective layer 5 and the layer with magnetic regions/printing inks 2. Such a protective layer optionally prevents mutual interference between the magnetic layer and the reflective layer, for example by corrosion, when the security element 18 is exposed to moisture. Two different printing inks are used for the magnetic regions 2, each with a different mixing ratio of low-coercivity material 4 and high-coercivity material 3.

Alternatively, a black, white or colored printing layer 6 may be provided in place of the reflective layer 5.

Figure 7:
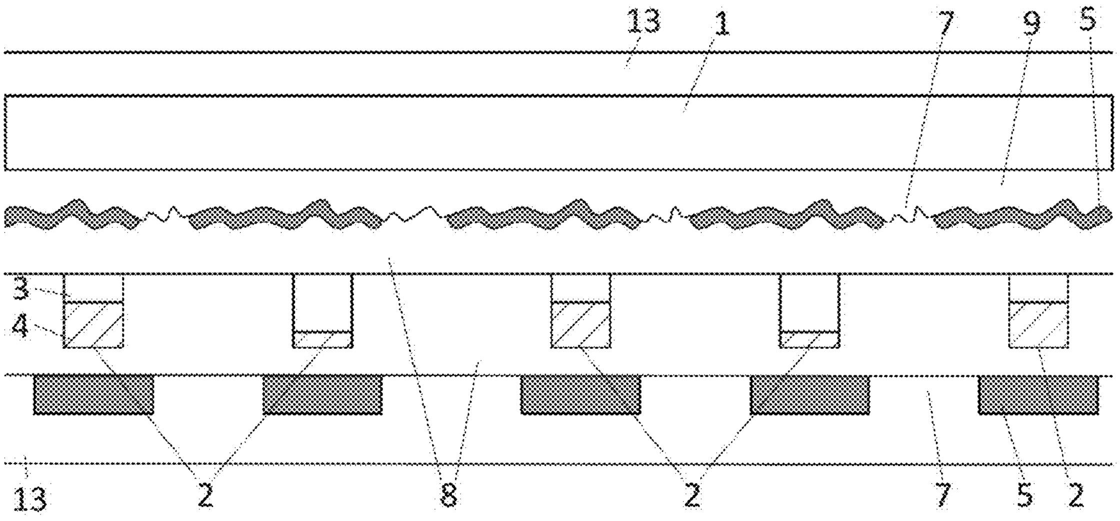

In the embodiment shown in FIG. 7, an embossed lacquer layer 9 is applied to a carrier substrate 1 made of a transparent plastic film, which is provided with a first partially applied reflective layer 5 with recesses 7*a*. A protective layer 8 is applied to this layer 5, and magnetic regions 2 which are spaced apart from one another are applied to this protective layer, for which two different printing inks are used, each having a different mixing ratio of low-coercivity material 4 and high-coercivity material 3. Subsequently, a protective lacquer layer 8 is again applied, and a second reflective layer 5 having recesses 7*b* is again applied to this protective lacquer layer 8. The recesses 7*b* in this second reflective layer 5 are situated such that the recesses 7*a* in the first reflective layer are at least partially visible. The security element is provided with an adhesive layer 13 on both sides in order to improve the anchoring in a value document.

Alternatively, a black, white or colored printing layer 6 may be provided in place of the first and/or second reflective layer 5.

Figure 8:
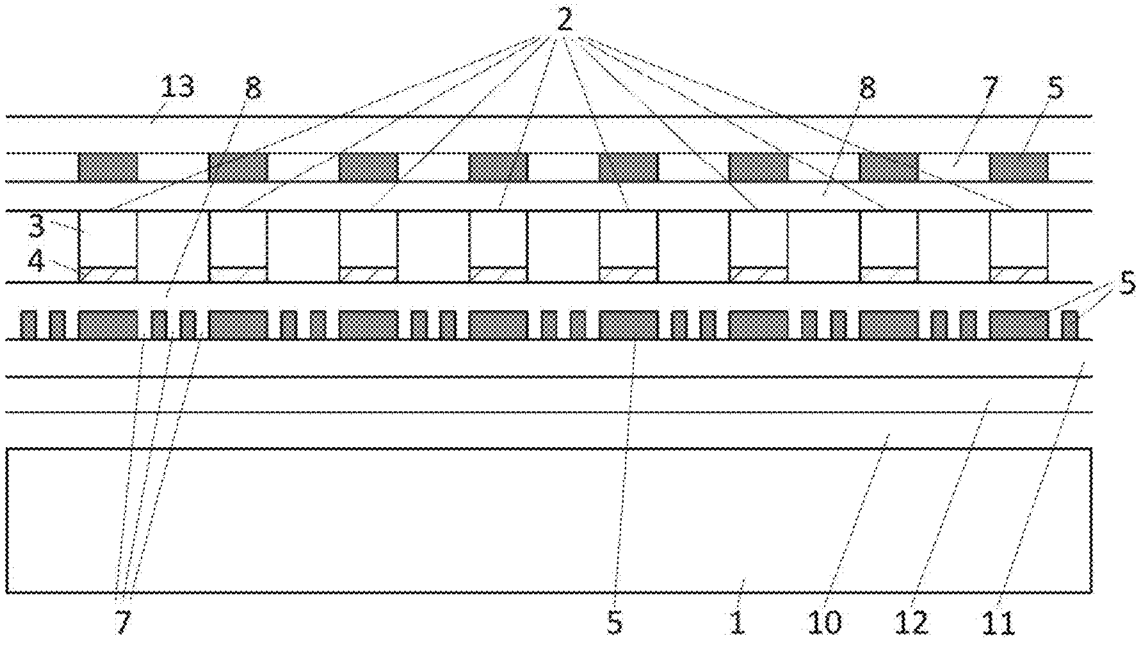

FIG. 8 shows an embodiment in which a release layer 10 is applied to a transparent carrier substrate 1 and a thin-film element with a color-shift effect, consisting of an absorber layer 12, a dielectric spacer layer 11 applied thereto and a reflective layer 5 with recesses 7, is applied to this release layer.

A transparent protective layer 8 is applied over this layered structure, on which spaced-apart magnetic regions 2 consisting of a printing ink with fixed proportions of low-coercivity material 4 and high-coercivity material 3 are printed.

Subsequently, a second transparent protective layer 8 is applied, on which in turn a second reflective layer 5 with recesses 7 is situated.

An adhesive layer 13 is applied to the entire structure, by which the security element can be fixed to an object. The carrier substrate 1 is then peeled off.

The security element shows a color-shift effect and a hidden magnetic coding.

Alternatively, a black, white or colored printing layer 6 may be provided in place of the second reflective layer 5.

Figure 8A:
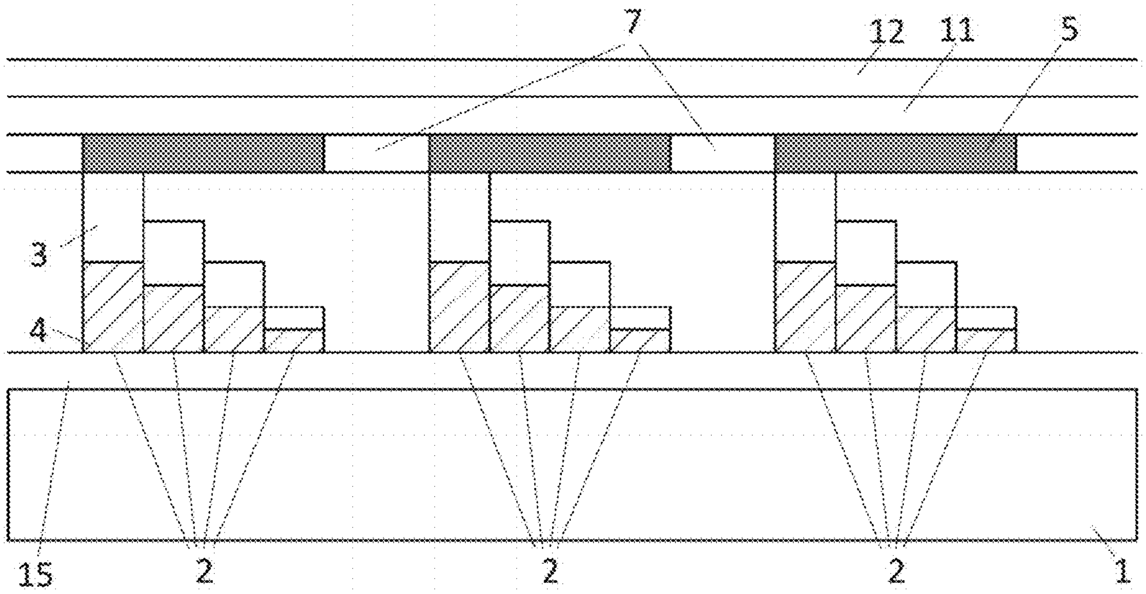

In FIG. 8*a*, a primer or undercoat layer 15 is applied to a metallic carrier substrate 1. On this transparent primer or undercoat layer, magnetic region groups are applied which are composed of magnetic regions/printing inks 2 applied directly adjacent to each other with a fixed mixing ratio of high-coercivity and low-coercivity materials 3, 4 having different thicknesses and the same width. Magnetic-layer-free regions are provided between the magnetic region groups. A thin film structure with a color-shift effect consisting of a partially applied reflective layer 5, a full-surface dielectric spacer layer 11 and an absorber layer 12 is provided above the magnetic region groups. The partially applied reflective layer 5 is applied true to register. i.e. in a defined position, to the respective adjacent magnetic regions 2.

The security element shows a partial color-shift effect as well as a hidden magnetic coding.

According to an embodiment not shown, the dielectric spacer layer 11 and/or the absorber layer 12 may also be partially applied, preferably true to register with the partially applied reflective layer 5.

Figure 9:
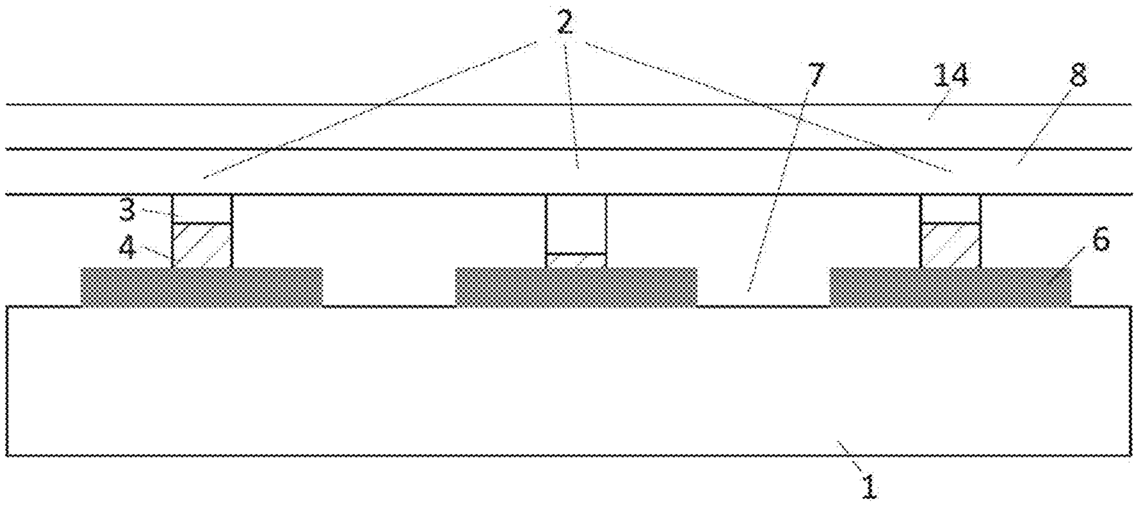

In the embodiment of the security element shown in FIG. 9, a dark colored or black printing layer 6 with recesses 7 is applied to a transparent carrier substrate 1. Magnetic regions 2 are applied to this printing layer, for which two printing inks with different mixing ratios of high-coercivity material and low-coercivity material 3, 4 are used. A liquid crystal layer (LC layer) 14 is applied to this structure with a protective layer 8 interposed therebetween. In those regions where the magnetic regions 2 and/or the printing layer are located under the LC layer 14, a color-shift effect can be seen due to the dark color of these regions.

Figure 10:
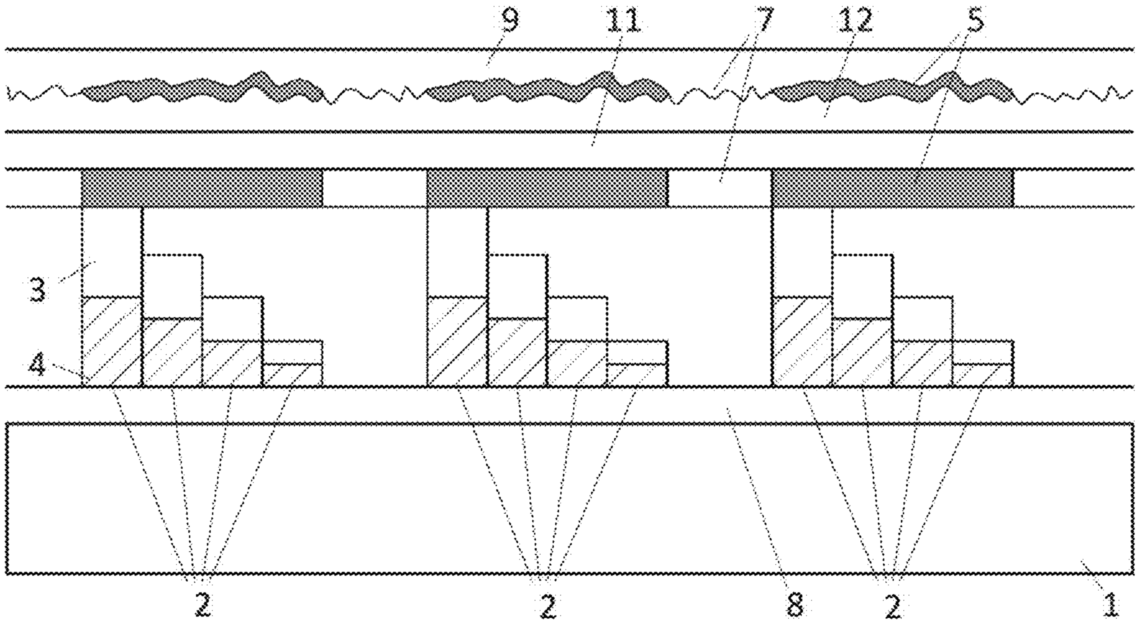

FIG. 10 shows an embodiment analogous to FIG. 8*a*, in which a lacquer layer with a diffractive structure 9 is additionally applied to the color-shift thin-film structure. The diffractive structure is provided with a partially applied reflective layer 5.

The security element shows a partial color-shift effect and additionally a diffractive effect as well as a hidden magnetic coding.

Figure 11:
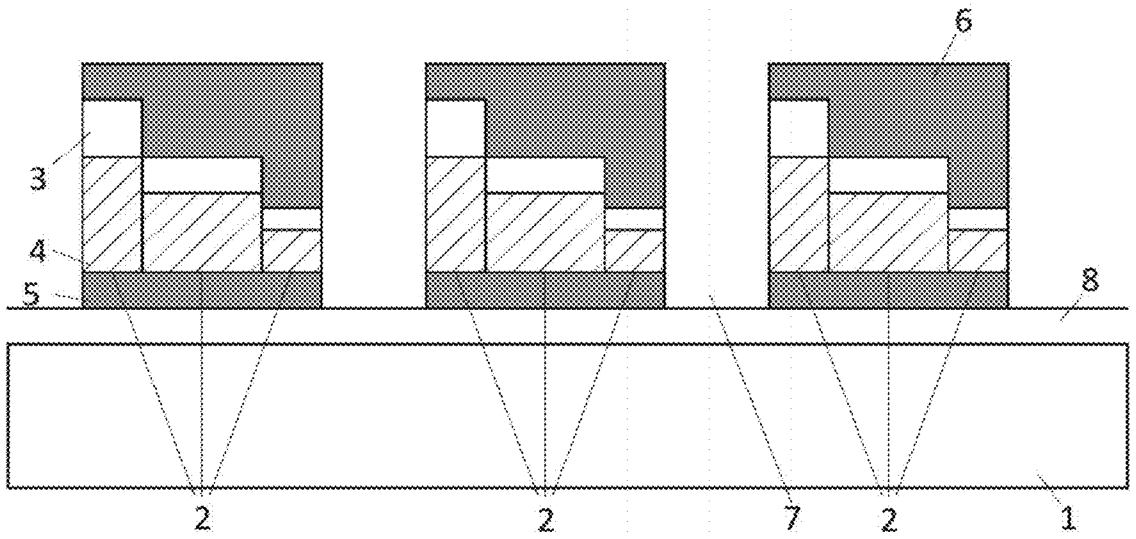

FIG. 11 shows an embodiment in which a protective layer 8 and then a reflective layer 5 with recesses 7 are applied to a metallic carrier substrate 1. True to register with the reflective regions, magnetic regions 2 with a fixed mixing ratio of low-coercivity material 4 and high-coercivity material 3 are applied directly adjacent to one another in different widths and different thicknesses, thus forming mutually spaced-apart magnetic region groups. Between the three magnetic region groups shown, magnetic-layer-free regions are provided which are arranged true to register with the recesses in the reflective layer 5. The mixing ratio of low-coercivity material 4 and high-coercivity material 3 in this exemplary embodiment is 2:1. A colored printing layer 6 is applied to each of the magnetic region groups, also true to register with the magnetic regions and the reflective layer 5.

Figure 12:
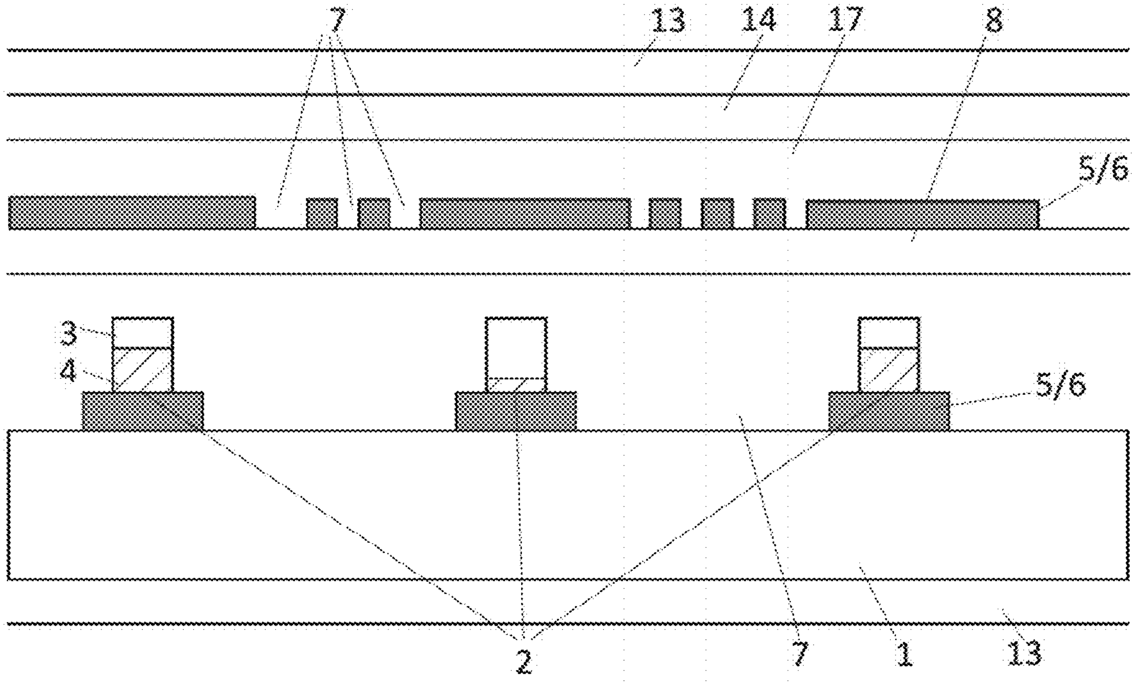

In the embodiment shown in FIG. 12, a reflective layer 5 or alternatively a printing layer 6 is applied to a carrier substrate 1. Magnetic regions 2 are applied to this layer 5/6, for which two different printing inks are used, each with a defined mixing ratio of low-coercivity material 4 and high-coercivity material 3.

A protective layer 8 is applied over the magnetic regions, on which a black reflective layer 5 or a partial black printed layer 6 is applied. This layer 5 or 6 has recesses 7 which may be in the form of letters, characters, patterns, symbols, lines and/or the like.

Against this layered structure, an LC layer 14 provided on a second carrier substrate is laminated by means of a laminating adhesive and the second carrier substrate is then peeled off. The layered structure can then be provided with an adhesive layer 13. The color-shift effect of the LC layer 14 is only visible in those regions in which the LC layer 14 is situated above the black reflective layer 5 or the black printing layer 6.

The security element shows a partial color-shift effect and a hidden magnetic coding.

Figure 12A:
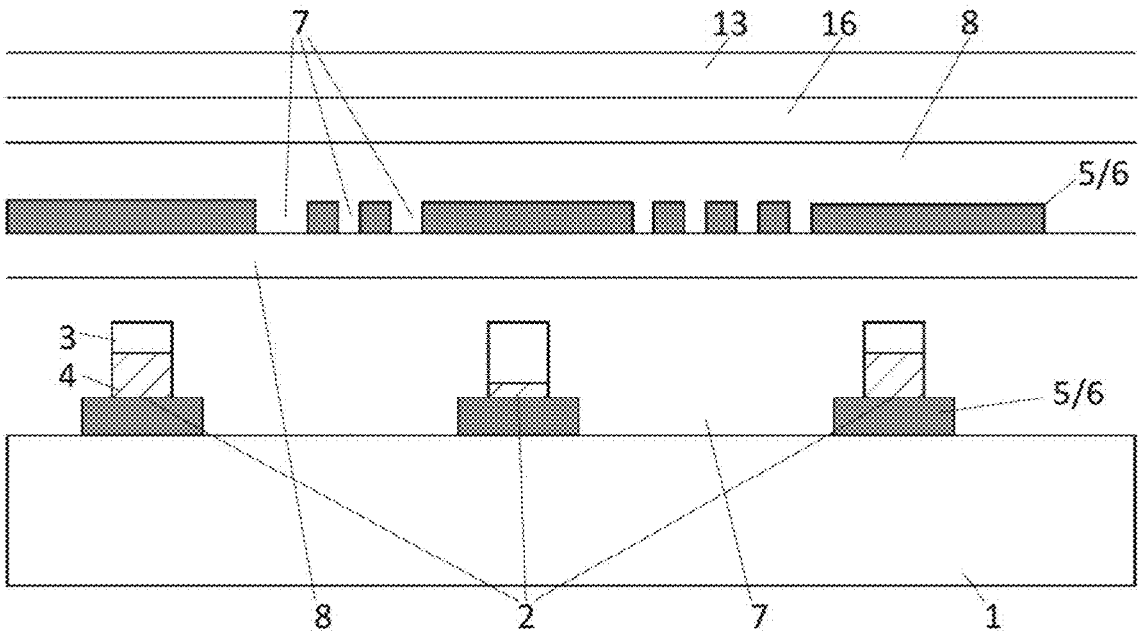

FIG. 12*a* also shows an embodiment with a partial color-shift effect, but this is produced by using a printing ink with interference pigments 16. The structure is essentially the same as that shown in FIG. 12, but in this case the ink with interference pigments can be applied directly to the protective layer.

Instead of a protective layer 8 made of a lacquer, as shown in the exemplary embodiments, a thin polymeric protective film can be used, which is bonded to the structure by means of a laminating adhesive It is understood that the mixing ratios of low-coercivity material 4 and high-coercivity material 3 given in the exemplary embodiments are merely provided by way of example, and other mixing ratios within the range of 1:20 to 20:1 according to the invention can be used in each exemplary embodiment. Likewise, the individual magnetic regions 2 can always have different mixing ratios as well.

The security elements according to the invention are suitable, optionally after appropriate finishing in the form of threads, strips or patches, for at least partial embedding in or application to data carriers, in particular value documents such as identity cards, cards, banknotes or labels, seals and the like. Furthermore, the security elements according to the invention in the form of a strip or patch can also be used to close an aperture in a data carrier.

The invention claimed is:

1. A security element (18) with machine-readable, magnetic security features (3, 4) in the form of at least two magnetic materials of different coercivity, which are present as a mixture in at least one printing ink (2), which is applied to a carrier substrate (1), wherein the at least one printing ink (2) is provided in at least two regions on the security element (18) in the same and/or different thickness, and a defined mixing ratio of the at least two magnetic materials (3, 4) of different coercivity is present in the at least one printing ink (2), and wherein at least two printing inks (2) having respectively different mixing ratios of the at least two magnetic materials (3, 4) are provided in at least two areas of the carrier substrate (1) in an identical and/or different thickness.

2. The security element (18) according to claim 1, wherein the at least two magnetic materials (3,4) are a high-coercivity magnetic material and a low-coercivity magnetic material.

3. The security element (18) according to claim 1, wherein a plurality of magnetic regions are formed on the carrier substrate (1), and wherein each magnetic region is formed by exactly one printing ink (2) and adjacent magnetic regions have different printing inks.

4. The security element (18) according to claim 1, wherein a plurality of identical and/or different printing inks (2) are arranged directly adjacent to one another on the carrier substrate (1) and thus form a magnetic region group.

5. The security element (18) according to claim 4, wherein the printing inks (2) of a magnetic region group have different thicknesses.

6. The security element (18) according to claim 5, wherein the thicknesses proceed in an increasing or decreasing manner from one side of the magnetic region group to the opposite side.

7. The security element (18) according to claim 4, wherein a plurality of magnetic region groups are provided which are arranged at a distance from one another.

8. The security element (18) according to claim 4, wherein a plurality of magnetic region groups are provided which are arranged at a constant distance from one another.

9. The security element (18) according to claim 1, wherein the mixing ratio of high-coercivity magnetic material and low-coercivity magnetic material is 20:1 to 1:20.

10. The security element (18) according to claim 1, wherein the security element (18) has a full-surface or partial opaque layer (5, 6) on one side of the carrier substrate (1) below and/or above the printing inks (2).

11. The security element (18) according to claim 10, wherein the opaque layer has recesses in the form of letters, numbers, characters, patterns, symbols or lines.

12. The security element (18) according to claim 10, wherein the opaque layer is a reflective layer (5) or a colored, black or white printed layer (6).

13. The security element (18) according to claim 10, wherein the opaque layer (5, 6) and/or the further security features are applied true to register and/or with register accuracy to the at least one printing ink (2).

14. The security element (18) according to claim 10, wherein the opaque layer and/or the further security features are provided on a second carrier substrate and are bonded to the magnetic regions (2) by lamination or lining with the layer structure.

15. The security element (18) according to claim 1, wherein the security element (18) comprises further security features.

16. A data carrier or value document, comprising the security element according to claim 1.

17. The data carrier or value document according to claim 16, wherein the security element (18) in the form of a thread, strip or patch is at least partially embedded in the data carrier or value document or applied to the data carrier or value document.

18. The security element (18) according to claim 1, wherein the at least two areas are spaced from each other.

* * * * *